US007660779B2

(12) United States Patent
Goodman et al.

(10) Patent No.: US 7,660,779 B2
(45) Date of Patent: Feb. 9, 2010

(54) INTELLIGENT AUTOFILL

(75) Inventors: Joshua T Goodman, Redmond, WA (US); Carl M Kadie, Bellevue, WA (US); David M Chickering, Bellevue, WA (US); Donald E Bradford, Pleasanton, CA (US); Dane A Glasgow, Los Gatos, CA (US)

(73) Assignee: Microsoft Corporation, Redmond, WA (US)

( * ) Notice: Subject to any disclaimer, the term of this patent is extended or adjusted under 35 U.S.C. 154(b) by 770 days.

(21) Appl. No.: 10/844,540

(22) Filed: May 12, 2004

(65) Prior Publication Data

US 2005/0257134 A1    Nov. 17, 2005

(51) Int. Cl.
*G06F 17/27*    (2006.01)
(52) U.S. Cl. .......................... 706/48; 706/18; 715/224; 715/226; 707/6; 707/100
(58) Field of Classification Search ............. 706/1, 706/2, 8, 12, 15, 17, 18, 20, 21, 45–48, 50–57; 703/3; 707/1, 3–6, 100; 704/1, 4–10; 715/500, 715/505–508, 512, 513, 780, 200, 221–226, 715/701
See application file for complete search history.

(56) References Cited

U.S. PATENT DOCUMENTS 6,192,380 B1 *   2/2001   Light et al. ............... 715/505
6,208,339 B1 *   3/2001   Atlas et al. ............... 715/780
6,564,213 B1 *   5/2003   Ortega et al. .............. 707/5
6,879,691 B1 *   4/2005   Koretz ..................... 380/255
7,343,551 B1 *   3/2008   Bourdev ................... 715/209
2002/0083068 A1  6/2002   Quass et al.
2003/0033288 A1* 2/2003   Shanahan et al. ........... 707/3

FOREIGN PATENT DOCUMENTS

WO    WO0106416 (A2)    1/2001

OTHER PUBLICATIONS http://codepunk.hardare.org, Advanced HTML Lesson 26: Select Boxes Feb. 4, 2004.

(Continued)

*Primary Examiner*—David R Vincent
*Assistant Examiner*—Omar F Fernandez Rivas
(74) *Attorney, Agent, or Firm*—Lee & Hayes, PLLC

(57) ABSTRACT

The present invention provides a unique system and method that can employ machine learning techniques to automatically fill one or more fields across a diverse array of web forms. In particular, one or more instrumented tools can collect input or entries of form fields. Machine learning can be used to learn what data corresponds to which fields or types of fields. The input can be sent to a central repository where other databases can be aggregated as well. This input can be provided to a machine learning system to learn how to predict the desired outputs. Alternatively or in addition, learning can be performed in part by observing entries and then adapting the autofill component accordingly. Furthermore, a number of features of database fields as well as constraints can be employed to facilitate assignments of database entries to form values—particularly when the web form has never been seen before by the autofill system.

45 Claims, 8 Drawing Sheets

OTHER PUBLICATIONS http://toolbar.google.com, Take the power of Google with you anywhere on the web, last viewed on Jun. 22, 2004.

http://codepunk.hardare.org, Advanced HTML Lesson 24: Getting Text Input, Feb. 4, 2004.

http://codepunk.hardare.org, Advanced HTML Lesson 25: GRadio Buttons & Checkboxes, Feb. 4, 2004.

http://codepunk.hardare.org, Advanced HTML Lesson 27: The File Selection Box, Feb. 4, 2004.

http://codepunk.hardare.org, Advanced HTML Lesson 28: Reset & Submit Buttons, Feb. 4, 2004.

http://codepunk.hardare.org, Advanced HTML Lesson 29: Generic Buttons, Feb. 4, 2004.

http://codepunk.hardare.org, Advanced HTML Lesson 30: Using TABINDEX, Feb. 4, 2004.

http://www.mozilla.org, Ranjan, et al., Applying Machine Learning to Autocomplete, Feb. 4, 2004.

Chusho, et al., "Automatice filling in a form by an agent for web applications", Software Engineering Conference, Dec. 4, 2002, pp. 239-247, XP010628835 ISBN: 0-7695-1850-8.

* cited by examiner

400

Purchase A Plan & Phone - Microsoft Internet Explorer

File  Edit  View  Favorites  Tools  Help

Address: C:\misc\verizoncheckout.htm

To complete your order for Verizon Wireless service, please complete the following information. All information provided will be transmitted using a secure connection to protect confidential data.

A red asterisk * denotes required fields.

User Information

Prefix       *First Name       M.I.   *Last Name        Suffix

*Email Address (to send order confirmation)

*Contact Number
[ ] - [ ] - [ ]   ext. [ ]

*Mobile Telephone Number    *Last 4 of SSN
[ ] - [ ] - [ ]

Billing Address

*Address Line 1

Address Line 2

*City       *State       *Zip Code
            Select a State

Shipping Address  ☐ Same as Billing Address

Prefix       *First Name       M.I.   *Last Name        Suffix

*Address Line 1

Address Line 2

*City       *State       *Zip Code
            Select a State

Payment Information

Your credit card name and billing address must match the billing address entered above.

FIG. 4

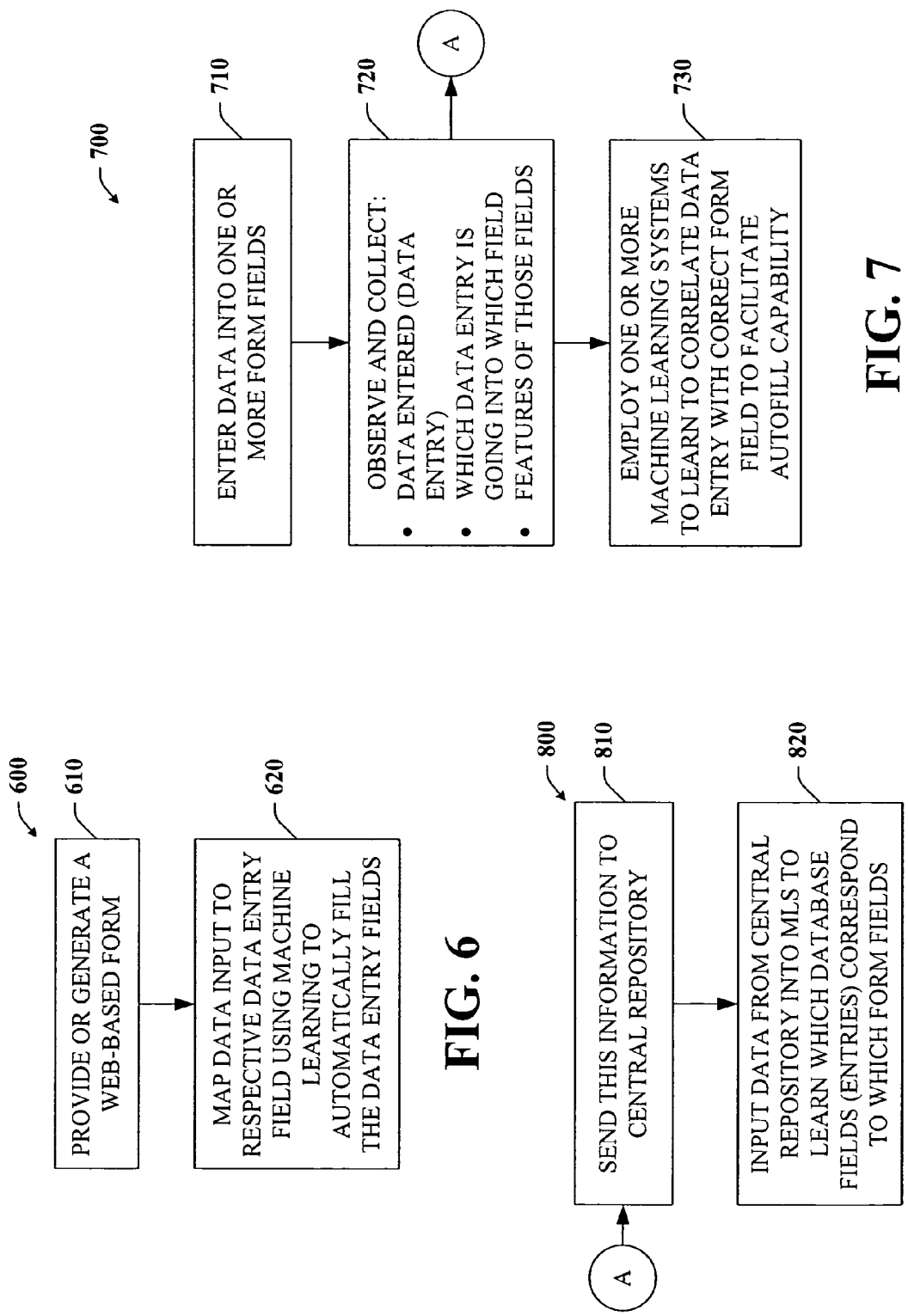

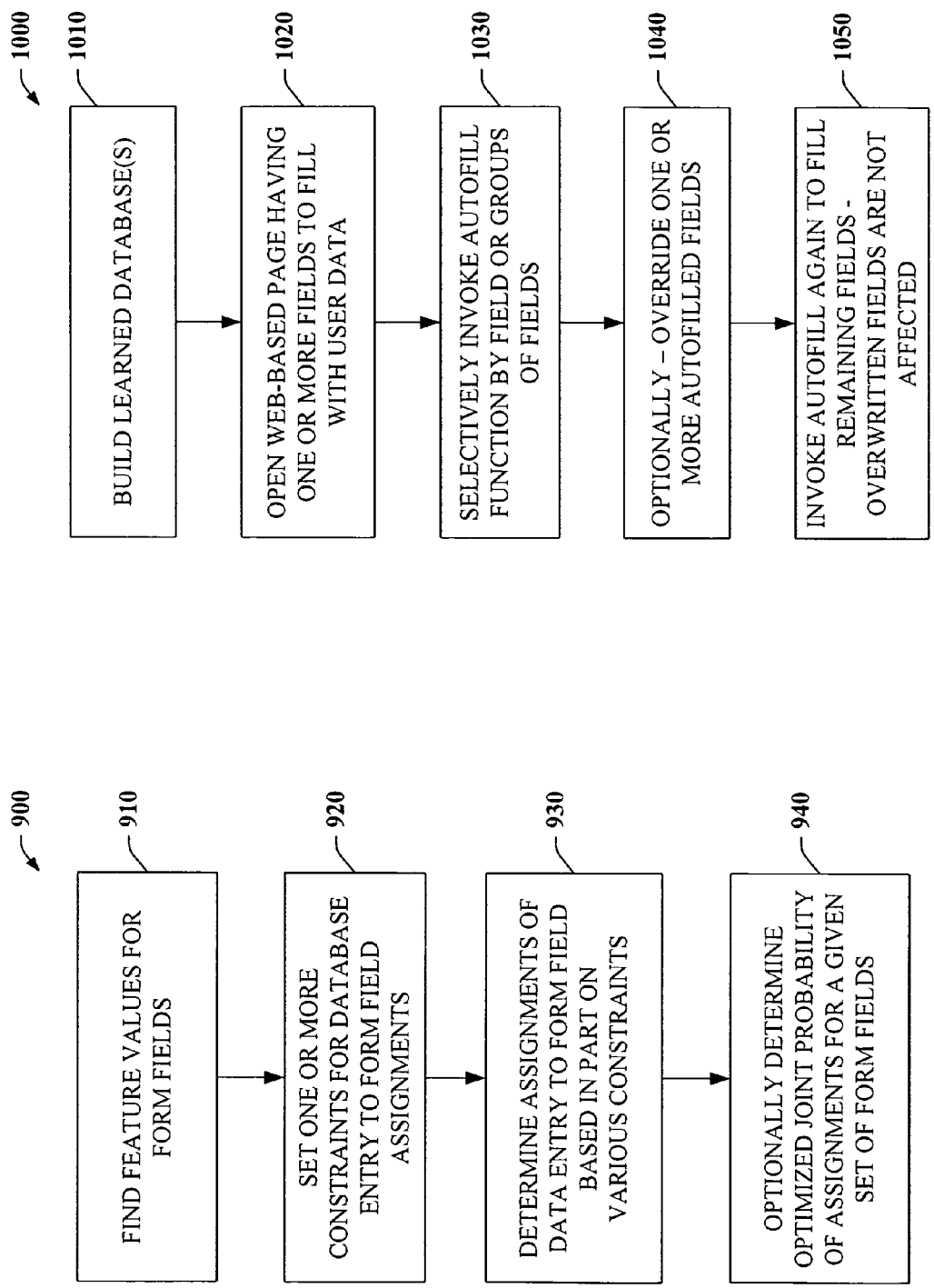

INTELLIGENT AUTOFILL

TECHNICAL FIELD

The present invention relates generally to learning user information and in particular to mapping user-based input to one or more fields of a web-based form to facilitate automatic entry of the user's information.

BACKGROUND OF THE INVENTION

Communicating and transacting business on the Internet has become a daily experience for both working professionals as well as the buying public. Internet users are commonly asked to fill out numerous forms—some of which may or may not be similar—such as when purchasing products, requesting information, or submitting questions. Users must repeatedly enter the same information including their name, home address, business address, email address, and/or phone numbers on a variety of different forms.

Unfortunately, conventional methods which have attempted to address these concerns are problematic. For example, in some techniques, previous entries can be remembered but only if the form is identical to the previous form. Considering the wide range of websites and massive number of website owners and operators on the Internet, this may not be a reasonable technique or solution to minimize waste of user time and increase user efficiency on the Internet.

Other traditional methods may provide automated input of some data, however, these methods may still be deficient and therefore, unable to meet the many needs of today's Internet user.

SUMMARY OF THE INVENTION

The following presents a simplified summary of the invention in order to provide a basic understanding of some aspects of the invention. This summary is not an extensive overview of the invention. It is not intended to identify key/critical elements of the invention or to delineate the scope of the invention. Its sole purpose is to present some concepts of the invention in a simplified form as a prelude to the more detailed description that is presented later.

The present invention relates to an improved data entry technique for use by a browser in a variety of different web forms that minimizes user effort. More specifically, the invention provides for a system and/or methodology that can employ machine learning techniques to automatically fill (autofill) one or more fields across a diverse array of web forms. By using machine learning techniques, the browser or other instrumented tool can learn which data or types of data correlate to which fields or types of fields. Other types of correlations can be learned as well, such as, that particular data is entered in particular fields on a particular webpage. For example, the machine learning technique(s) of the present invention can increase data autofill as compared with explicit programming.

According to one approach, the system and method can utilize one or more databases of information about the user and learn which fields map to which database entries (or items). In particular, a database of field information can be generated in part by observing and collecting user input via an instrumented tool or toolbar. Determining what form fields (fields on a web-based form) should be filled with which database fields (fields from the database) can be learned as well. For example, it can learn that in a form field labeled FIRST, the user is likely to enter the "first name" information from their database. When a user comes to a new web form, the browser, for example, needs to determine if the form includes entries that can be filled by the browser, and if so, which entries correspond to which parts of the database. In addition, if there are multiple database entries, then determining which database entry to use for a given form should be performed as well.

Obtaining the training data to make any of the above determinations can be a crucial task. Fortunately, the training need not necessarily be user specific. In one aspect of the present invention, the training data comprising correct input and output features can be collected in some manner. For instance, a toolbar can collect and aggregate for some users which database entries he puts into which fields and what the features of those fields are. This information can be sent back to a central repository. The data in the central repository can be used as input to a training algorithm to learn which database fields correspond to which form fields. For example, it can be learned that a database field labeled "firstname" corresponds to a form field labeled FIRST. If a user enters "Joshua" in the form field labeled FIRST and the user has a database field labeled "firstname," then the information FIRST and "firstname" can be sent back. Thus, the personally identifiable information does not have to be included to carryout this aspect of the invention.

As mentioned above, database fields and various features derived there from can be employed for training purposes. For example, characteristics of form fields can be exploited and used as features to distinguish among different types of data and different types of form fields. In particular, each form field has an input type such as text, which can indicate a textbox. The fact that the form field is a text-type field can be useful information because it can facilitate deducing what data is included in the field. That is, if it were something other than a text field, for example, a combo box, it probably would not contain a name or address.

Features can be based on form field names, character size or width of the form field, text around the form field, and/or position of the form field with respect to other form fields that may or may not be known or identified. Examining HTML tables can also facilitate determining what words or data are located above, below, to the left, or to the right of a particular form field. Furthermore, using nearby text or sub-strings of nearby text that may or may not be identical to the nearby text can provide additional information.

In another aspect of the invention, database fields can be assigned to form fields or values based at least in part on one or more constraints. Constraints can control the assignments of database fields/entries to form values in many different circumstances. For example, constraints can be employed when it is apparent that the web form has conflicting output types or to verify that database entries can or cannot be reused within a single web form.

In some cases, such as when introduced to a new web form, a best assignment of database entries to form fields can be desired. This best assignment can be determined in part by maximizing joint probabilities according to one or more constraints. Examples of the types of constraints can include not allowing one form field (e.g., address line #2) without another form field (e.g., address line #1), reuse constraints to mitigate repeated use of an entry, composition constraints to handle conflicting output types, and/or order constraints (e.g., area code precedes exchange).

In yet another aspect of the present invention, the mapping from database fields to form values can be personalized. For instance, it may be observed that on a particular web page, a user rejects the suggested automatic entry and enters data manually. Some of this data may match entries in the database. Thereafter, it can be learned that for this particular user, certain form field entries correspond to the observed database entries as opposed to the learned database entries. Hence, the user can override the automatic entry with some other data and the system or method can learn this other data. In the alternative or in addition, the user's manual inputs can be site-specific (for this user)—meaning that such input is only used on this particular web page or website. Moreover, the automatic entries can be modified based on observing user input in response to an autofill operation.

In still another aspect of the invention, heuristics or learning can be employed when there are multiple sets of fields such as home address and business address or billing address and shipping address. For example, in HTML forms, these addresses often appear in different tables. Thus, their respective locations or tables can be learned and they can be separated into any number of subsets.

Another approach may not use a database, but instead involves observing and/or tracking a user's data entry to learn what data to enter into which fields. In particular, user input of data into a plurality of form fields can be observed and stored for offline learning or tracked and adapted to via online learning. In offline learning, a plurality of observed instances of field entries including sensitive information can be stored and then used as input for a machine learning system at a later time. Online learning employs an online learning algorithm such as one of a Naïve Bayes approach, gradient descent, winnow, or the perceptron algorithm, among others that does not need to store any information, except, for example, model itself which may contain some personally identifiable information. Many aspects of the invention discussed above can also be combined with this observed-entry approach.

In some instances, not all form fields may be visible to the user; yet nonetheless, they can be filled. This may raise many security or privacy concerns for the mere fact that the user may be unaware of the information he is publishing. In response to such concerns, another aspect of the present invention provides a display on the user interface that can allow a user to see a listing of the form fields on the page and/or those that were automatically filled. This can be especially effective for autofilled radio buttons or check boxes since they may not be noticeable to the user or the user may not expect them to be autofilled.

The listing of form fields can also be linked to the actual form fields on the web page. Hence, a modification to a listed form field can affect the content in the actual form field. Alternatively, use of the autofill feature can be tied to security measures in place on the user's computer. That is, the autofill feature can be available on only trusted sites or sites which satisfy the user's security level.

To the accomplishment of the foregoing and related ends, certain illustrative aspects of the invention are described herein in connection with the following description and the annexed drawings. These aspects are indicative, however, of but a few of the various ways in which the principles of the invention may be employed and the present invention is intended to include all such aspects and their equivalents. Other advantages and novel features of the invention may become apparent from the following detailed description of the invention when considered in conjunction with the drawings.

BRIEF DESCRIPTION OF THE DRAWINGS

FIG. 4 is an exemplary screen display of a web form to which an intelligent autofill system can be applied to effectively and efficiently fill the desired fields based in part on learned data in accordance with an aspect of the present invention.

FIG. 6 is a flow chart illustrating an exemplary methodology that facilitates automatic entry of form fields based on machine learning techniques in accordance with an aspect of the present invention.

FIG. 7 is a flow chart illustrating an exemplary methodology that facilitates learning what data corresponds to which fields in accordance with an aspect of the present invention.

FIG. 8 is a flow chart that can extend from the methodology in FIG. 7 illustrating an exemplary approach to learning user input in accordance with an aspect of the present invention.

FIG. 9 is a flow chart of an exemplary methodology that facilitates entering user data into a new web form based in part on any number of constraints and conditions in accordance with an aspect of the subject invention.

FIG. 10 is a flow chart of an exemplary methodology that facilitates preserving user input entered over autofilled input in accordance with an aspect of the present invention.

DETAILED DESCRIPTION OF THE INVENTION

Figure 1:
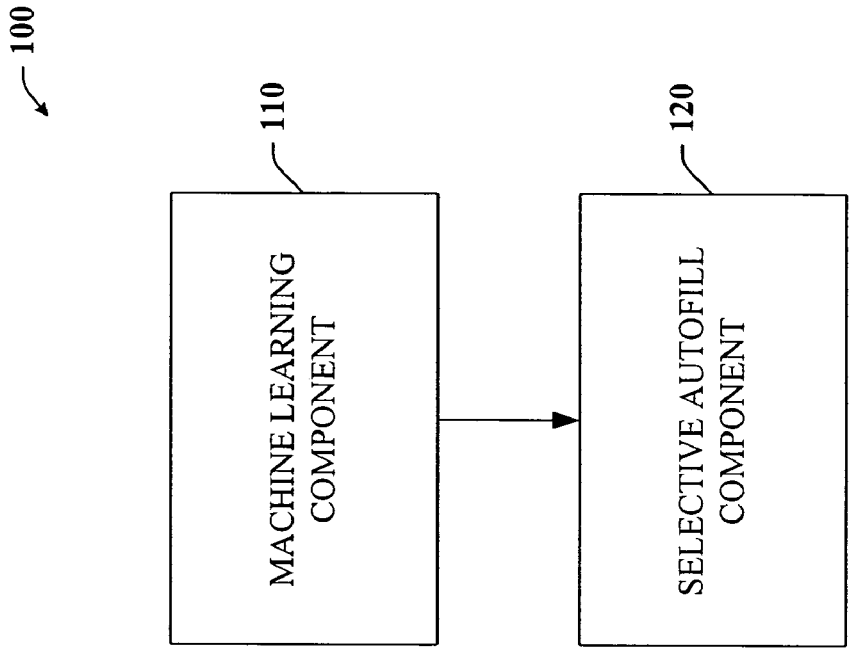
FIG. 1 is a high level block diagram of an intelligent autofill system that makes use of machine learning in accordance with an aspect of the present invention.

The present invention is now described with reference to the drawings, wherein like reference numerals are used to refer to like elements throughout. In the following description, for purposes of explanation, numerous specific details are set forth in order to provide a thorough understanding of the present invention. It may be evident, however, that the present invention may be practiced without these specific details. In other instances, well-known structures and devices are shown in block diagram form in order to facilitate describing the present invention.

As used in this application, the terms "component" and "system" are intended to refer to a computer-related entity, either hardware, a combination of hardware and software, software, or software in execution. For example, a component may be, but is not limited to being, a process running on a processor, a processor, an object, an executable, a thread of execution, a program, and a computer. By way of illustration, both an application running on a server and the server can be a component. One or more components may reside within a process and/or thread of execution and a component may be localized on one computer and/or distributed between two or more computers.

Additionally, the term database entry can refer to data or other user-based input that is sent to one or more databases. A database entry can be located in a corresponding database field in the database. The term "form field" refers to fields which can accept input from a user and can display output as well; thus there can be different input types and different output types. Different output types can correspond to different field types. The term "input field" as used herein can also refer to a field in which a user enters some data or information. Depending on the context, input fields can refer to form fields as well.

The subject invention can incorporate various inference schemes and/or techniques in connection with generating training data for machine learned autofilling of form fields. As used herein, the term "inference" refers generally to the process of reasoning about or inferring states of the system, environment, and/or user from a set of observations as captured via events and/or data. Inference can be employed to identify a specific context or action, or can generate a probability distribution over states, for example. The inference can be probabilistic—that is, the computation of a probability distribution over states of interest based on a consideration of data and events. Inference can also refer to techniques employed for composing higher-level events from a set of events and/or data. Such inference results in the construction of new events or actions from a set of observed events and/or stored event data, whether or not the events are correlated in close temporal proximity, and whether the events and data come from one or several event and data sources.

The present invention relates to learning for each field in a web-based form whether or not it is fillable from one or more databases, for example. Using machine learning systems and techniques, the autofill systems and methods of this invention can learn what data corresponds to which form fields and then automatically fill the form fields when requested by a user.

There are many different types of HTML web forms or rather form fields, as they may be referred to herein. They can range from textboxes to select boxes to radio buttons. In order to successfully fill form fields automatically, it may be important to determine what data goes in a particular form field. Typically, coding can reveal what the form is, where the form starts, and where the form ends. Each field has a type such as text and can be named for identification purposes. Thus, there are several features associated with web forms that can be learned to facilitate recognizing the type of form field and what data can or should be entered without user effort.

For instance, the fact that a field is a text field can be a feature. If the name of the field is "last name", then that indicates that the contents should be a person's last name which can be a feature. Text around a form field matters as well since the text may say something about what is in the field. Thus, "First" or "Last" or "Name" can indicate that a user first name, last name or full name, respectively, are or should be entered in the field.

Radio buttons are little circles that are traditionally arranged in a list and that can be checked by clicking them. Only one button in a group of buttons can be checked at a time. Thus, checking one button clears previously checked buttons in the group. Radio buttons have a "radio" type and those that are arranged in a group should have the same name so that they can work together. However, each button within the group can have different text tags to distinguish them from the others. The text tag corresponding to a checked button can be learned and remembered.

In practice, radio buttons can be used to indicate a user's shipping preference. To mitigate user effort, the desired radio button corresponding to ground shipping, for example, can be autofilled each time a user visits a checkout-related web page. Check boxes can be learned in a similar manner though they are fundamentally different from radio buttons in that more than one check box can be selected by a user.

Because the autofilling of radio buttons and check boxes is nonconventional, such autofilling can be unexpected by the user. To address this, higher thresholds in terms of learning and/or correlating matches may be needed to provide greater assurances that the autofilled data is correct.

Select boxes can also include data that can be learned and autofilled. They are relatively common on most web forms such as for providing a listing of state names or abbreviations. Such a listing can be detected and the particular listing or state chosen can be learned as well. In addition to select boxes, submit buttons can be used as well in the learning process. In particular, they can be related in context to something else that was typed in. For example, a submit button named "purchase" or "buy" may be related to the context of typing in an address. Thus, when autofilling new or never-seen-before web forms, detecting that a submit button named "buy" was selected by the user can indicate that address and/or name data was probably entered as well.

Other indicators can be employed as well to facilitate detecting what data corresponds to which fields. For instance, field width can be important. The "first name" field may be shorter than the "last name" field. Similarly, an address field can be longer than a name field. Other nuances relating to position, arrangement, order, and the like of form fields can contribute to the learning and autofilling processes. Moreover, machine learning can be very sensitive to these subtle clues or hints. In fact, such subtleties can be important to effectively and successively learn which data belongs in which fields and the assignments of data to fields when multiple variations of fields are present.

Form fields can be created for many different kinds of information. In addition to the standard types of input fields such as, for example, first name, last name, full name, address, company, city, state, zip, phone number, email address, paragraphs of text like warranty and disclaimer information, questions, options, opinions, personal information, and other general text, form fields can be created for inputting the name of a file, typically filled in by users by browsing for the file. Oftentimes, the file that a user desires to upload (e.g., by inputting into a field) is the one he most recently used. Therefore, these fields can be autofilled using recently accessed files on the user's system.

In particular, some operating systems may include a "my recent documents" folder, and this field can be autofilled at least in part by using the most recently used files. The length of time since the user accessed these documents can also be considered when determining whether to use them for the autofill. This recency can be compared to the recency of other files entered into file fields, and some combination of recently used entries and recently accessed files in these fields based at least in part on the times of last access and the times of last entry can be entered.

In practice, imagine that a user has recently modified a digital photo and now would like to share with family and friends by uploading it to a photo site. The file form field can be autofilled in part by examining the recently accessed files to assist in determining which file to enter.

Referring now to FIG. 1, there is a high level block diagram of an intelligent autofill system 100 that facilitates automatically entering data into form fields on a webpage. The system 100 comprises a machine learning component 110 that can learn what input, such as name (first and last names), address (email, home, business, billing, or shipping address), phone number (home, business, fax, or mobile number), zip code, state, file name, and/or any other data, corresponds to which fields on any given web form. The machine learning component 110 can learn to predict an output value given a set of inputs—also referred to as training data.

Training data consisting of correct input and output features can be collected in some way. For instance, a specially augmented toolbar can collect and aggregate this information. This data can be given as input to the training algorithm. The algorithm may be provided by any one of the myriad of machine learning techniques that create a neural network, logistic regression, maximum entropy model, decision tree, Naïve Bayes model, perceptron, winnow, any linear separator, support vector machines, etc. Most model types output scores or probabilities of each possible output given the feature values.

A learned model results therefrom, which can then be applied to subsequent web forms by way of a selective autofill component 120. When invoked by a user, the selective autofill component 120 can enter the most appropriate entry into the field based in part on the learned correlations between the data and the fields. The selective autofill component 120 can be invoked field by field, in groups of fields, or all at once to fill all fillable fields. Drop down menus for each field can be populated as well as an alternative to entering the data directly into the form field. The items presented in the drop down menus can be selected based on the learned correlations including the observed entries.

Furthermore, the machine learning component 110 as well as the selective autofill component 120 can be tied or linked to one or more databases such as an address book, contact list, account registration, user profile, and the like. The system can automatically determine which database entry to use based on information already entered. In particular, the machine learning component can be trained on the data stored in one or more of the databases. During use, the selective autofill component 120 can extract data from the respective databases as needed. For example, a user may type in his mother's first and last name and then invoke the autofill component 120. Because the mother's first and last names are manually entered by the user, the autofill component can detect this, search for a database entry that contains those names as first and last name entries, and then autofill the remainder of the form using the mother's information from the database.

Figure 2:
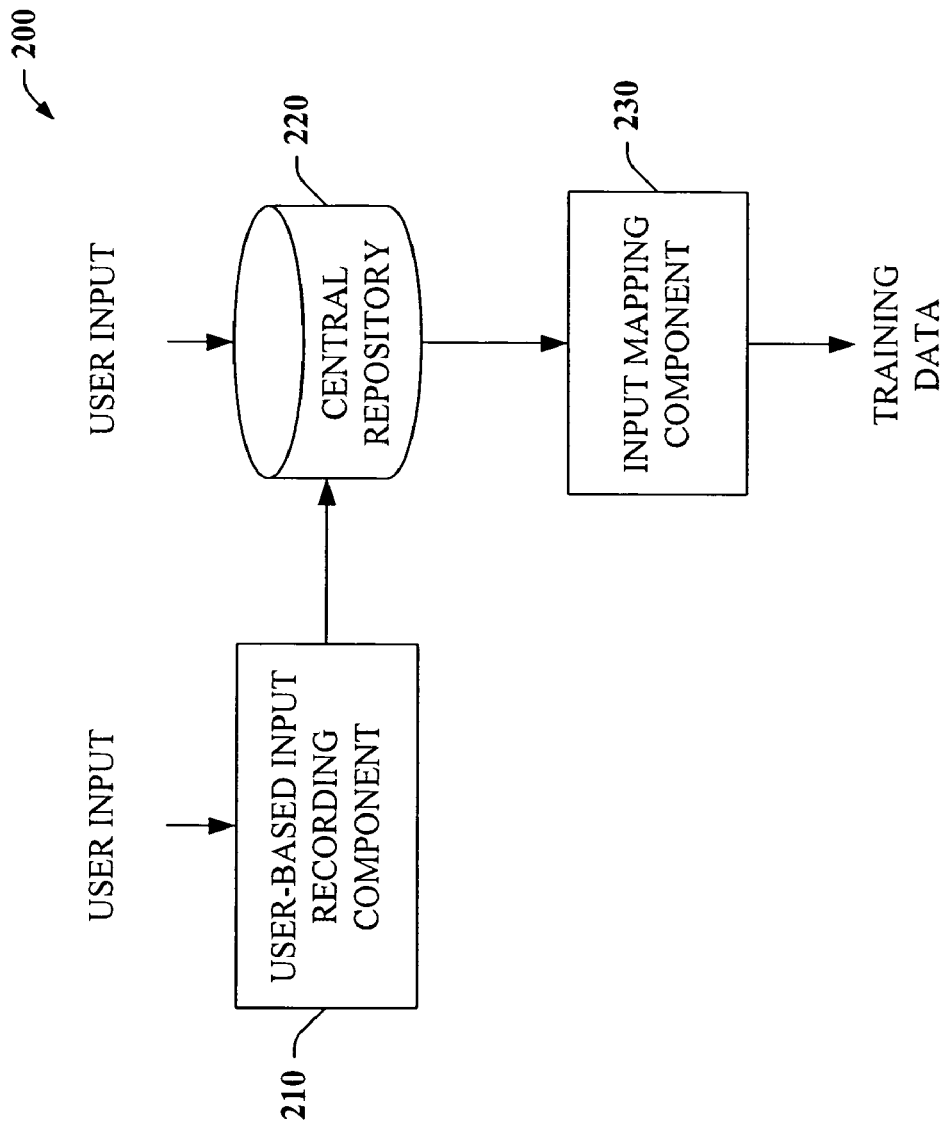
FIG. 2 is a block diagram of an intelligent autofill system that feeds collected data to a database(s) where it can be used as input to a machine learning system to learn what data corresponds to which fields in accordance with another aspect of the present invention.
Figure 3:
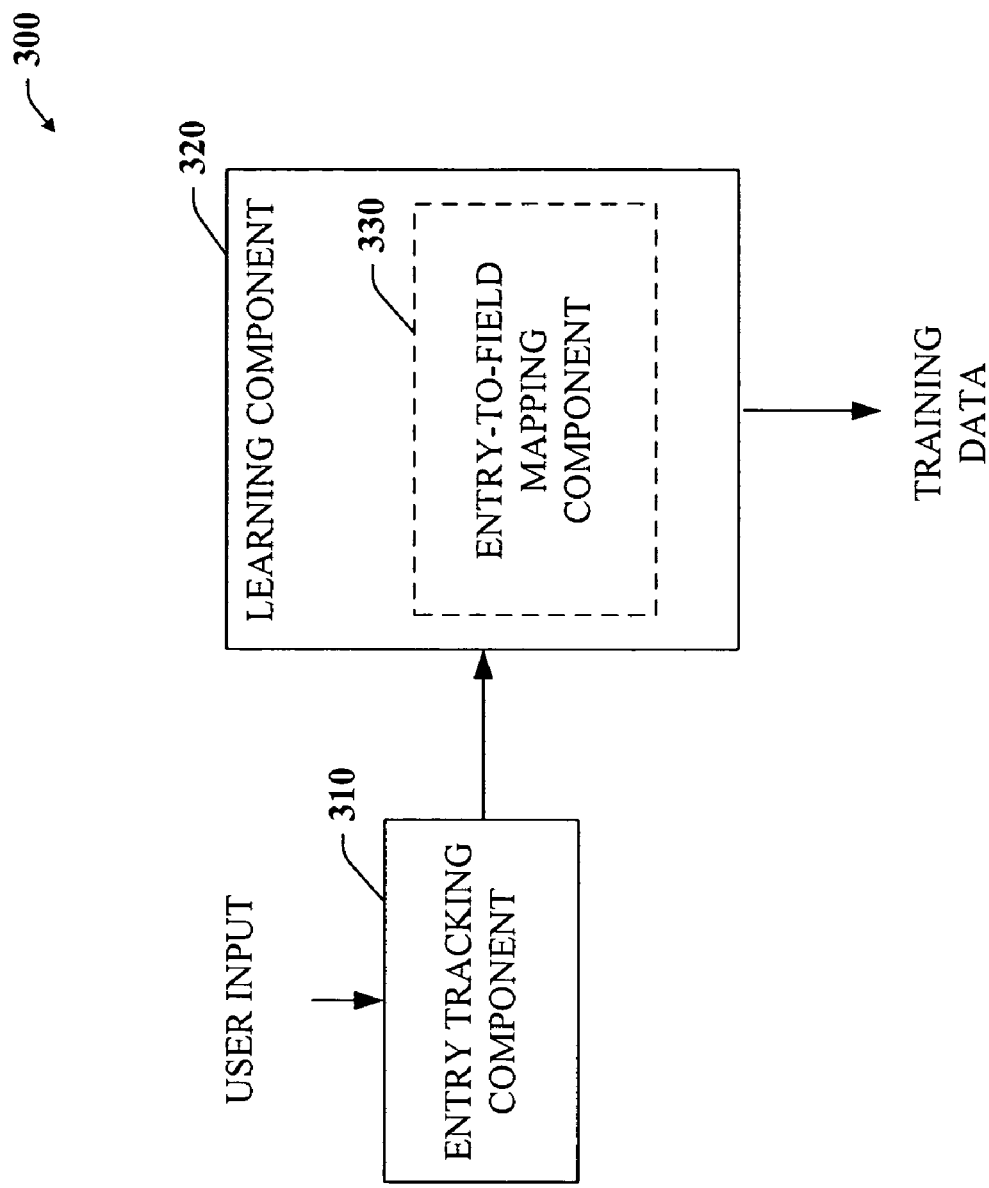
FIG. 3 is a block diagram of an intelligent autofill system that learns what data corresponds to which fields in part by observing user inputs in accordance with yet another aspect of the present invention.

There may be several different approaches to employing machine learning to perform data entry on web forms in an automated fashion. FIGS. 2 and 3 describe at least two different approaches which can be combined or employed separately—along with machine learning techniques. In FIG. 2, there is illustrated a block diagram of an autofill training scheme 200 that is database-oriented in accordance with an aspect of the present invention. The training scheme 200 comprises a user-based input recording component 210 that can observe and/or collect data entered by a user. For example, a user can enter his mailing information into a web-based form when ordering an online magazine subscription. Particular data and types of data (e.g., text, checked box, etc.) and their corresponding form fields (name, email address, billing address, etc.) can be collected and sent to a central repository 220.

Alternatively or in addition, users may be asked to pre-populate one or more databases such as one for a user's personal profile, contact list, address book, product registration, and/or account registration. These databases can be aggregated or simply fed to the central repository 220 as well. The data or at least a portion thereof that is maintained in the central repository 220 can be used as input for a machine learning algorithm to generate one or more sets of training data. An autofill system can then be trained using the training data to learn what database entries to fill which form fields.

More specifically, an input mapping component 230 can make use of the central repository data by mapping actual data to the appropriate form field. For instance, the mapping component 230 can map the data "98052" to a ZIP form field, and the fact that the numeric data "98052" corresponds to the ZIP form field can be learned. Thus, when the ZIP form field is seen again on a web form, the autofill system can enter or suggest entering "98052" in that field.

In situations where privacy is a concern, the actual data (e.g., "Fred") need not be sent to or stored in the central repository 220. Instead, the term "firstname" can be sent to represent the user's data in the FIRST NAME field.

In practice, imagine that a user is using a browser and stops on an e-commerce web page such as Amazon.com to buy a book. The user enters his first name in the form field identified as FIRST and his last name in the field identified as LAST. This information, including the web page, can be collected by an instrumented toolbar and stored in a central database and then learned so that when the user or any other user revisits Amazon.com to buy more books, the autofill system can recognize that it is the same page and then predict that the same information (e.g., first name in FIRST field and last name in LAST field) should be entered accordingly. In general, once the system sees or recognizes something that it was trained on, there is a relatively high likelihood that it will make the right prediction the next time.

However, an alternate approach that may be simpler to implement is to simply learn, for a given user, what he is most likely to enter in the field. This approach may not use a database at all. This can be referred to as the observed-entry approach. For example, the observed-entry approach can learn that the user typically enters "Joshua" in a field named FIRST rather than learning that he usually enters the "first name" field from his database in a field named FIRST. A machine learning system can still be used for this. The potential outputs of the system are all field values that a user has ever entered. For instance, if he has entered his first name, his last name, several phone numbers, and several email addresses, all of these become potential entries. The inputs to the system are the same kinds of features as input to a Boolean system, discussed below. Optionally, this learning is not done if the fields appear to contain or relate to sensitive information (e.g., credit card information or passwords).

FIG. 3 illustrates a block diagram of an observed-entry training scheme 300 that can facilitate autofilling form fields. The observed-entry training scheme 300 comprises an entry tracking component 310 that can monitor and track data entries made by a user. Since no data is moved to a long term storage repository or database for learning purposes, the entry of information can be more important and/or more influential to the autofill output.

As soon as the scheme 300 detects the inputted data, a number of features about the data and web form can be learned by a learning component 320. In one instance, the actual data can be associated with the particular form field. For example, a user types his first name "Joshua" into a FIRST NAME field. This can be characterized as a feature to learn: that the character or text string J-o-s-h-u-a corresponds to a FIRST NAME field. Other features include observing and learning that the form fields are located on a particular web page; that the FIRST NAME field may be to the left of and shorter in width than the LAST NAME field; that if the user begins entering data left to right, then the most left field is probably a first name field; that numeric data longer than five digits is most likely a phone number; and various other characteristics relating to the form fields and even the web page itself.

Furthermore, the observed-entry scheme 300 may often make use of order information. For instance, immediately after entering "Joshua", the user often enters "Goodman."

Immediately after entering his area code, the user typically enters his exchange. Thus, features for each value preceding the next value can be created.

The learning component 320 can perform offline or online learning. In offline learning, a plurality of observed instances of field entries including sensitive information can be stored and then used as input for a machine learning system at a later time. Any machine learning system can be employed; however, offline learning tends to be more time consuming than online learning. Furthermore, because sensitive information can be stored, offline learning may tend to be more effective than online learning. Online learning employs an online learning algorithm such as one of a Naïve Bayes approach, gradient descent, winnow, or the perceptron algorithm, among others that does not need to store any information, except, for example, the model itself which may contain some personally identifiable information. When a new instance is observed, the autofill system 300 can adapt. In essence, the data entered by a user can be mapped to the form field (by way of an entry-to-field mapping component 330) without employing a database or central repository.

However, observed-entry methods can be used in conjunction with database entry methods. For instance, for any given field, the probability of being filled with an entry from the database times the probability that the database field is the correct entry can be learned. The probability of being filled with an entry not from the database times the probability given by the observed-entry model can be learned as well. The generated guesses can be arranged or ranked based on this information.

Regardless of which approach is taken, training data can be generalized which can be useful for many types of web pages (e.g., e-commerce sites) who may alter their pages slightly from time to time or present them in different languages. Training data can still produce correct responses despite such changes which add to its versatility with respect to performing autofill operations with respect to web-based forms.

Turning now to FIG. 4, there is illustrated an exemplary HTML web form 400 from a Verizon Wireless web page. The following is an example of the corresponding HTML source:

```
<!---==== Customer Information table/starts here ======---->
<TABLE WIDTH="585" BORDER="0" CELLSPACING="0" CELLPADDING="1">
    <TR>
        <TD WIDTH="5" BGCOLOR="#990000">
            <IMG
SRC="https://www.verizonwireless.com/images/shared/pixel/trans.gif"
                    WIDTH="5" HEIGHT="1" BORDER="0" ALT="">
        </TD>
        <TD WIDTH="583" CLASS="smtext3" BGCOLOR="#990000" COLSPAN="5">
            <STRONG>User Information</STRONG>
        </TD>
    </TR>
<TR>
  <TD WIDTH="5">
    <IMG
SRC="https://www.verizonwireless.com/images/shared/pixel/trans.gif"
            WIDTH="5" HEIGHT="1" BORDER="0" ALT="">
  </TD>
</TR>
<TR>
    <TD WIDTH="5">
        <IMG
SRC="https://www.verizonwireless.com/images/shared/pixel/trans.gif"
            WIDTH="5" HEIGHT="1" BORDER="0" ALT="">
    </TD>
    <TD width="93">Prefix</TD>
    <TD width="170"><STRONG><SPAN CLASS="text2">*</SPAN></STRONG>First Name</TD>
    <TD width="30">M.I.</TD>
    <TD width="195"><STRONG><SPAN CLASS="text2">*</SPAN></STRONG>Last Name</TD>
        <TD width="186">Suffix</TD>
</TR>
</TABLE>
<TABLE WIDTH="585" BORDER="0" CELLSPACING="0" CELLPADDING="1"><TR>
        <TD WIDTH="5">
            <IMG
SRC="https://www.verizonwireless.com/images/shared/pixel/trans.gif"
                    WIDTH="5" HEIGHT="1" BORDER="0" ALT="">
        </TD>
        <TD WIDTH="93">
            <SELECT NAME="p_prefix">
                <OPTION VALUE></OPTION>
                <OPTION VALUE="MR">MR
                <OPTION VALUE="MS">MS
                <OPTION VALUE="MRS">MRS
                <OPTION VALUE="DR">DR
            </SELECT>
        </TD>
        <TD WIDTH="135">
            <INPUT TYPE="text" CLASS="input" NAME="p_first_name" VALUE=""
```

-continued

```
        SIZE="15" MAXLENGTH="15">
    </TD>
    <TD WIDTH="30">
        <INPUT TYPE="text" CLASS="input" NAME="p_mid_init" VALUE=""
            SIZE="2" MAXLENGTH="1">
    </TD>
    <TD WIDTH="160">
        <INPUT TYPE="text" CLASS="input" NAME="p_last_name" VALUE=""
            SIZE="18" MAXLENGTH="20">
    </TD>
    <TD WIDTH="184">
        <SELECT NAME="p_suffix">
            <OPTION></OPTION>
            <OPTION VALUE="JR">JR
            <OPTION VALUE="SR">SR
            <OPTION VALUE="2">2
            <OPTION VALUE="3">3
            <OPTION VALUE="4">4
        </SELECT>
    </TD>
</TR>
</TABLE>
```

The key to understanding this HTML is to find the regions labeled as "input" (in bold) above. The first input is the user's first name. It consists of the following:

<TD WIDTH="135"><INPUT TYPE="text" CLASS="input" NAME="p_first_name"VALUE=" " SIZE="15" MAXLENGTH="15"></TD>

This says:

| | |
|---|---|
| <TD WIDTH="135"> | A table entry, 135 pixels wide |
| <INPUT | The only thing in the table entry is an Input field. |
| TYPE="text" | The user's input will be text. |
| CLASS="input" | Affects the appearance of the box in some browsers, and can probably be ignored. |
| NAME="p_first_name" | The "field name" -- This is the name of the field as it will be communicated back to the server when the form is submitted, like a variable name in a computer program, but in this case used for communication between a web page on a client and on a server. |
| VALUE=" " | The initial value for the field, in this case the empty string |
| SIZE="15" | The width of the field as displayed (e.g., 15 characters wide) |
| MAXLENGTH="15"> | The maximum length for the field entry |

All of this information can be very helpful for a machine learning system to predict that this is a first name entry. For instance, the fact that the field name contains both "first" and "name" is extremely helpful. The fact that the field width and size are 15 characters is also helpful (notice, for instance, that the last name field entry has width 20). In addition, this field entry is in the form of a table. If one parses this table, one can see that the table entry immediately above is, <TD width="170"><STRONG><SPAN CLASS="text2">*</SPAN></STRONG>First Name</TD>

The fact that the table entry above is not an input field, and contains the string "First Name" is highly indicative that this is a first name field. In some cases, the table entry immediately to the left is also useful, as is the table entry immediately to the right. For instance, the fact that the field immediately to the right in this case is also an input field, and has the name "p_last_name" is also highly indicative that this is a first name field. Using nearby text or sub-strings of nearby text that are not identical or not simply exact matches can be useful as well.

Machine learning systems usually try to learn to predict an output value given a set of inputs. In this example, the possible output values might be "first name", "last name", "city", "state". "address line 1", "address line 2", "phone #", etc., as well as "none"—for a field type we did not know how to autofill. The inputs to the system are values such as:

Maxlength=15
    Size=15
    Fieldname="p_first_name"
    Fieldname-to-right="p_last_name"
    Text-above= "<TD width="170"><STRONG><SPAN CLASS="text2">*</SPAN></STRONG>First Name</TD>"
  etc.

These inputs are then converted into feature values, typically Boolean but sometimes numeric, categorical and/or relational. In this case, the Booleans might include:
    MaxLengthBetween15and19=true
    SizeBetween15and19=true
    SizeExactly15=true
    FieldNameContains_First true
    FieldnameContains_Name=true
    FieldNameEquals_p_First_Name=true
    FieldNameRightContains_Last=true
    FieldNameRightContains_Name=true
    FieldNameRightSizeBetween20and24=true
    TextAboveContains_First=true
    TextAboveContains_Name=true There are many other possible feature values, most of which would have value false in this case.

The Boolean values may be determined automatically, e.g., by finding useful ranges, and by looking for common, useful character subsequences. Alternatively, the Boolean values may be determined manually, e.g., by a programmer inspecting input values and determining the most useful Boolean values.

Figure 5:
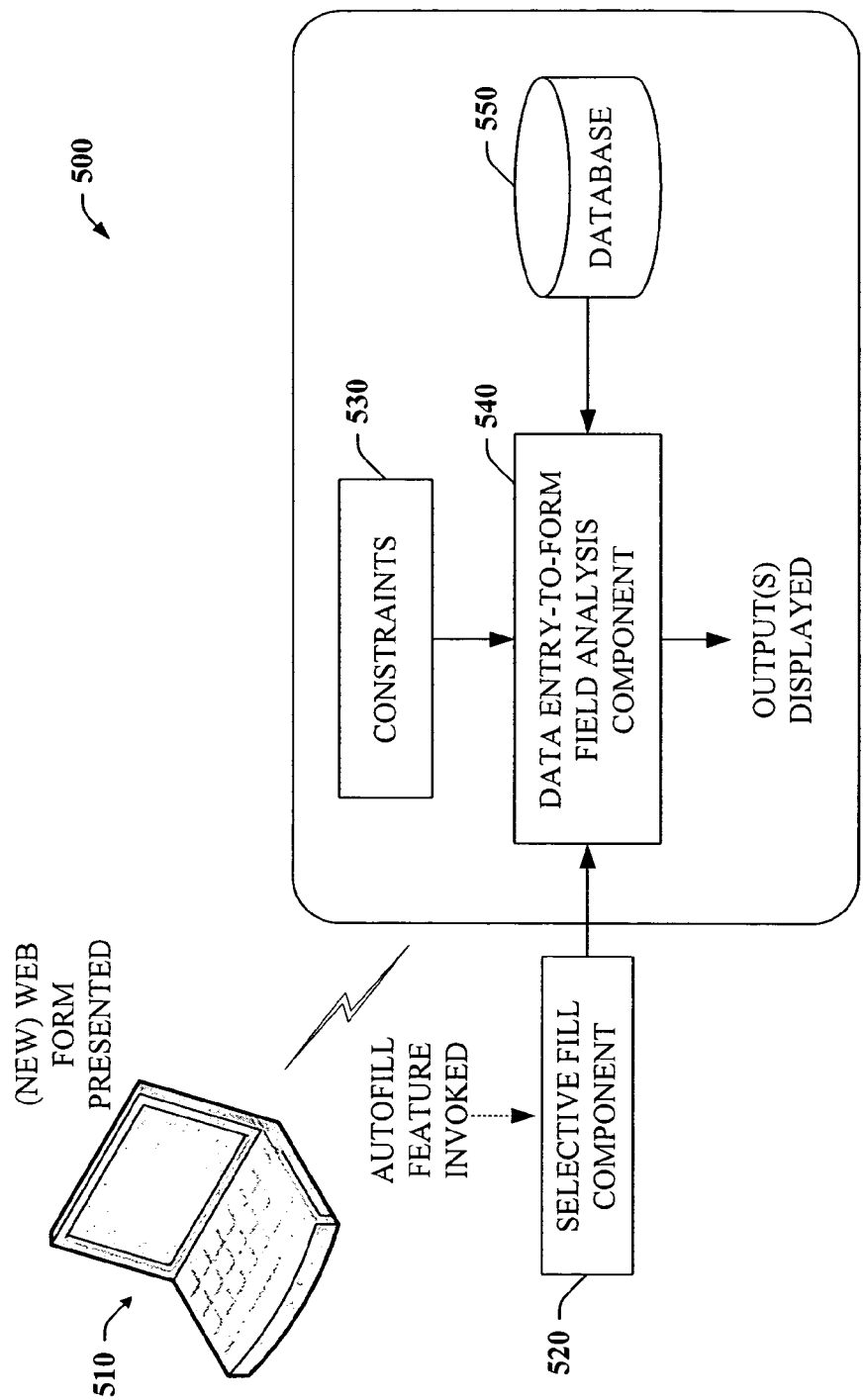
FIG. 5 is a schematic block diagram demonstrating employment of an intelligent autofill system with respect to a new web form in accordance with still another aspect of the present invention.

Turning now to FIG. 5, there is illustrated a schematic block diagram of an intelligent autofill system 500 that has been trained in accordance with an aspect of the present invention. The diagram indicates that a new web form has been presented or displayed to the user (510) and that the autofill feature has been invoked by a user to fill one or more of the form fields. In particular, a selective fill component 520 can be triggered to call upon the automatically entry of information into the one or more form fields.

When a new form is seen, the feature values for all fields can be determined. These can then be passed to the learned model, which outputs probabilities, scores, or 0-1 values for each output (field type) for each field. For instance, the form fields and their values can be mapped out: one field can have a 90% likelihood of being first and 10% not first (or 10% last) and another can have a 90% chance of being last and 10% first. Thus, the best assignments should be found to facilitate filling the data into the forms fields with the greatest amount of accuracy.

The assignment of data entries (or database entries) to form values can be based at least in part upon one or more constraints 530. Constraints 530 can be set to limit or restrict certain types of assignments from being made. One example of a constraint limit relates back to the number of times a database entry can be used in a given form. Typically, a database entry should only be used once per form, though in some cases (e.g., a phone number), it may be appropriate to allow reuse. If reuse of certain fields is banned or prohibited (e.g., set as a constraint), the most likely or highest scoring assignment of field names to database names consistent with the reuse constraints can be found. Thus, a data entry-to-form field analysis component 540 can evaluate the one or more applicable constraints for the given web form and then determine assignments of data entries (from an optional database 550) to form fields. Eventually, the autofill system's "suggested" outputs can be displayed in the respective form fields.

There might also be conflicting output types present such as "first name", "last name", and "name" (which would be composed of both first name and last name), for example. Thus, a composition constraint can be set that assumes that these different variations should exist on the same page. The constraint can dictate that there can be only a "name" field or "first" and "last" name fields. If the "name" field is present, then construct the data by concatenating the first and last name fields from the database, for example. Similarly there might be "area code", "exchange" and "last4digits" fields as well as a "phone number" field (consisting of all 3 fields from the database concatenated). In either set of circumstances, the most likely or highest scoring assignment of field names consistent with the composition constraints can be determined as well (since having both a name entry and a last name entry is not allowed).

Some field entries should never be used without other field entries. For instance, the second address line (#2) entry might never be used without the first address line (#1) entry. The user's middle initial might never be used without his first name. Similarly, the middle initial might never occur before the first name field; address line 12 might never occur before address line 1. Moreover, the most likely or highest scoring assignment of field names consistent with these constraints can also be found.

Furthermore, if a person is filling in information from left to right, the system can guess that the initial data entry corresponds to the first name and then predict that the field to the right is the last name field. Therefore, observations can be made in consideration of constraints to better determine assignments of data input fields to form fields.

Features unique to some form fields may be limited to constraints as well. For example, a feature may be present for a particular database field being above, below, to the left of, to the right of, immediately above, immediately below, immediately to the left of, or immediately to the right of some other field. Thus, in practice, the "exchange" field could be expected to be immediately to the right of the "area code" field. When the system 500 is employed, it can be possible to not "know" which input fields are which, but many different assignments can be tried and an attempt can be made to pick one that is consistent with the constraints.

In the alternative, several different assignments can be made. Following therefrom, maximized joint probabilities of particular assignments of input fields to form fields that include these layout features can be determined. This can be accomplished in part by conditioning the following: what is the probability of this first thing being first and a second thing being second given the first thing, and the third thing being third given the first and the second things, and so forth. When this is multiplied out, an overall joint probability can be obtained. Thus, instead of thinking of this problem as assigning each field independent of the others, the best assignment of the fields can be determined in terms of maximizing the joint probabilities.

The constraints 530 may be hard or soft constraints. In a hard constraint, the constraint must be satisfied. In a soft constraint, there is a large penalty for violating the constraint.

Much of the previous discussions have involved building an autofill system that works for every user (not user-specific) . However, the autofill system can also be customized according to the user. In particular, the mapping from database fields to form values may be personalized. For instance, it can be observed that on a particular page, a user rejects our suggested automatic entry, and enters data manually. Some of this data may match entries in the database. Thus, it can then be learned that for this user, these input field entries correspond to the observed database entries. Following, the user's autofiller can be updated with this information. Information can also be updated in a site-specific way, thereby learning that the entries on a particular web page correspond to particular database entries. Moreover, the user can customize the autofill system from the beginning or can be presented with default settings that can be modified by the user as needed.

Personalization can be performed in a site-specific or a machine-learned, general way. For example, the system can observe that when a field says NOMBRE, the user enters "Jose"—not Juan which may be the autofill suggestion. If site-specific, the system can notice that the user typed in "Jose" on this particular page. In general, database entries and/or any personalization may optionally be stored on a computer separate from the user's computer (e.g., on a server accessed over the Internet or over a LAN).

Some forms, such as the example page above, may contain multiple sets of fields, (e.g., a home address and a business address). Heuristics or learning can be used to identify such cases. For instance, on the Verizon page (FIG. 4), the different addresses are in different tables. Typically, the different addresses may be spatially disjointed and/or relatively far apart in the actual text of the page. Thus, it can be learned to split the information into respective sets (e.g., home address and business address).

In some cases, the autofill system may not immediately suggest to a user the correct entries for a particular form. As a user manually enters data on a form, we may observe what the user enters, and try to determine either other mappings of input fields to database fields consistent with his entries, or a different entry in the database. For instance, the system may enter the user's home address, but then observe him entering data consistent with his business address. Alternatively, the system can observe the user enter data consistent with an entry in his contacts list. In this case, new automatic field entries based on the best ranked consistent entries can be made.

Suggestions for entries may be made using an "all-at-once" user interface, as currently done, but may also be made in an incremental fashion, (e.g., through a drop-down list in each field), with or without a database of fields and with or without machine learning. As the user begins to enter data in a field, there can be a drop down box with the best suggestions based in part on what the user is entering (e.g., user types "J" and a drop down box offers "Joshua"). Alternatively, at the moment the user enters an input field, (e.g., by using the arrow keys, tabbing, or clicking in the field), the field can be filled with the best suggestion. When a user types in a field that contains selected text, the selected text can be automatically removed; but if the user performs no typing, the text can stay there.

Various methodologies in accordance with the subject invention will now be described via a series of acts, it is to be understood and appreciated that the present invention is not limited by the order of acts, as some acts may, in accordance with the present invention, occur in different orders and/or concurrently with other acts from that shown and described herein. For example, those skilled in the art will understand and appreciate that a methodology could alternatively be represented as a series of interrelated states or events, such as in a state diagram. Moreover, not all illustrated acts may be required to implement a methodology in accordance with the present invention.

Referring now to FIG. 6, there is a flow diagram of an exemplary method 600 that facilitates automatic entry of data into one or more form fields on a web page in accordance with an aspect of the present invention. The method 600 involves providing or generating a web-based form at 610. The web-based form can include one or more form fields that a user desired to fill in an automated fashion. This minimizes user and may mitigate data input errors. At 620, data input can be mapped to a respective data entry field using a machine learning technique. As a result, the machine learning system can learn what data corresponds to which fields.

Referring to FIG. 7, there is a flow diagram of an exemplary method 700 that facilitates generating training data for use in a machine learning system in connection with building an intelligent autofill system. The method 700 can begin with a user entering data into one or more form fields on a web page at 710. At 720, one or more of the following can be observed and/or collected by one or more instrumented toolbars: data entered into at least one respective form field; which data entry is going into which form field; and/or features of the respective form fields. At 730, one or more machine learning systems can be employed to learn the correlations between the data entries and the correct form field such that when a new page or a previous page is revisited, the method 700 can know what data to enter into which fields in an automated fashion. Such learning can involve offline learning or online learning.

Optionally, the data collected at 720 can be sent back to a central repository or database at 810 as demonstrated in FIG. 8. The data in the central repository can be mapped to their respective fields, resulting in the generation of one or more sets of training data. The training data can then be used as inputs into a machine learning system to learn which database fields or entries correspond to which form fields. As a result of such learning, form fields on a user's web page can be automatically filled for regardless of whether the web page has been seen before or not.

Turning now to FIG. 9, there is a flow diagram of an exemplary method 900 that facilitates assigning database entries to form fields, particularly when the web form has never been seen before by the autofill system or method. In such circumstances, the method 900 can initially find feature values for the form fields at 910. The feature values can be probabilities or scores, depending on how they are calculated. At 920, one or more constraints can be set to regulate or control the assignments of data entries (or database entries) to form fields. There are several kinds of constraints that can be employed such as, but not limited to, composition constraints (e.g., conflicting output types), reuse constraints (e.g., use of same data entry more than once per form), order constraints (e.g., some forms necessarily are located in a certain order, position or distance away from other form fields), and/or companion constraints (e.g., some forms cannot be used independent of other forms).

At 930, the assignments of data entries to form fields can be determined based at least in part on one or more constraints. The constraints may include both hard and soft constraints. Contrary to hard constraints, soft constraints are not required to be satisfied. However, failing them can lead to a severe penalty. Instead of determining the assignment of each form field independently of the other form fields, whether neighboring or not, a maximized joint probability can be computed at 940 to determine the overall probability of the assignments. Many different sets of assignments can be made, and the respective probabilities of each assignment within a set of assignments given the other assignments within that set can be multiplied out altogether. The set of assignments having the highest joint probability can be selected and utilized to autofill a web-based form.

Referring now to FIG. 10, there is a flow diagram of an exemplary method 1000 that demonstrates the invocation of an intelligent autofill method or system as described above. In this particular scenario, one or more databases can be built at 1010 and the data stored therein can be correlated to match a database entry with a form field. At 1020, imagine that a user has opened a web-based form page having one or more fields to fill the user's data. At 1030, the user selectively invokes an autofill function by field or by groups of fields.

For example, the autofill feature can be invoked all at once to fill the fields all or at once, from field-to-field whereby each field can be autofilled as desired by the user, and/or by a group of fields (e.g., fields that are related such as address field, city field and state field). Assuming that the at least one field has been autofilled, the user can override the data by simply typing over it. This "new" data can be learned as well and the autofill component can be modified to recognize when this new data should be used. After overriding, the autofill feature can be invoked again such as to fill in the remaining fields. The overwritten fields are not affected, however. In addition, the autofill feature can observe the data manually entered by the user and then autofill the rest of the fields using data that is relevant to the overwritten data.

For example, imagine that a NAME field is autofilled initially. The user deletes his name and inserts his brother's name. His brother's information may be stored in one of the databases accessibly by the autofill component. Thus, upon recognizing the brother's name, the autofill component or method can proceed to pull the brother's data from the database to populate the form fields accordingly.

Figure 11:
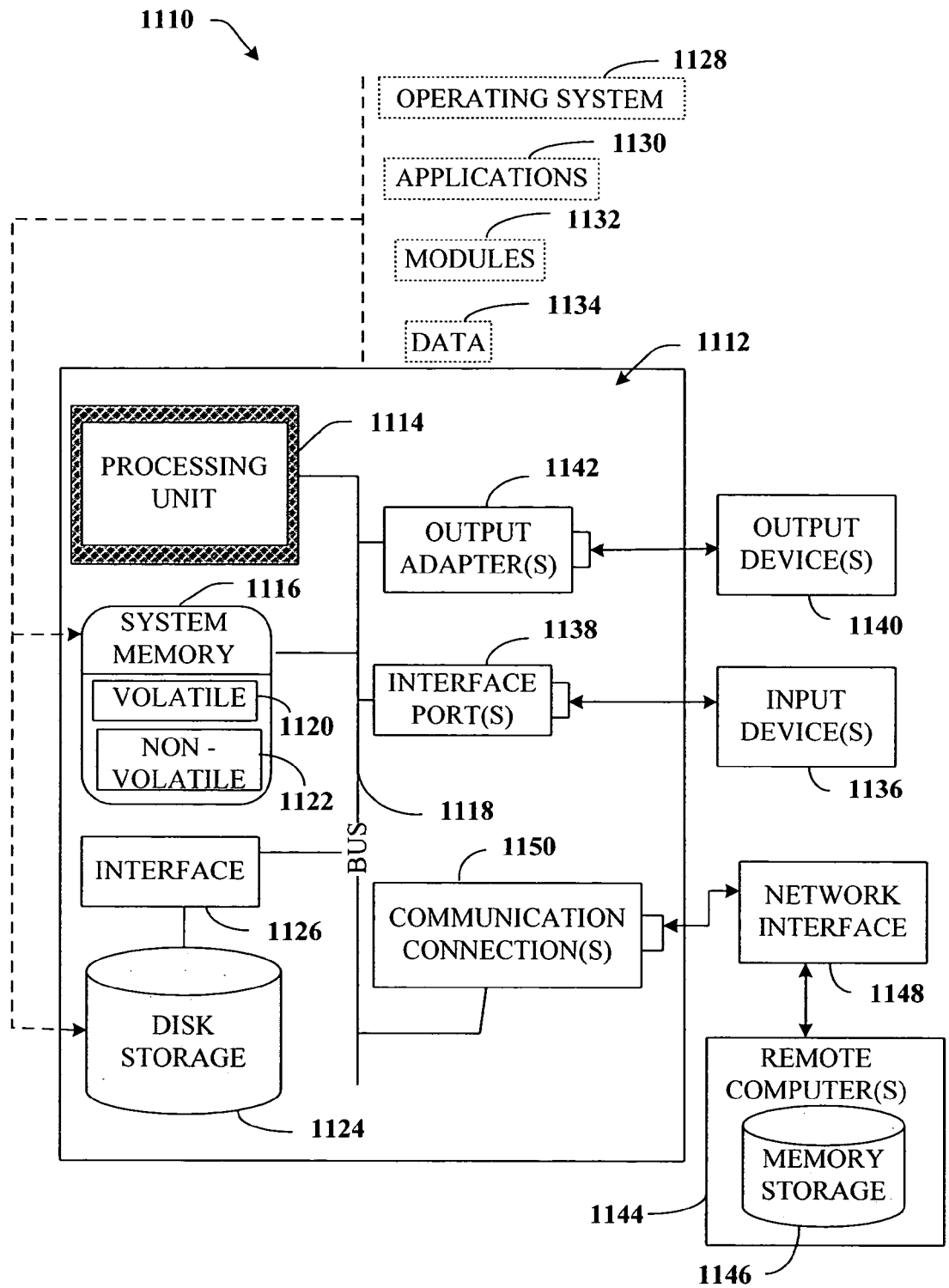
FIG. 11 illustrates an exemplary environment for implementing various aspects of the invention.

In order to provide additional context for various aspects of the present invention, FIG. 11 and the following discussion are intended to provide a brief, general description of a suitable operating environment 1110 in which various aspects of the present invention may be implemented. While the invention is described in the general context of computer-executable instructions, such as program modules, executed by one or more computers or other devices, those skilled in the art will recognize that the invention can also be implemented in combination with other program modules and/or as a combination of hardware and software.

Generally, however, program modules include routines, programs, objects, components, data structures, etc. that perform particular tasks or implement particular data types. The operating environment 1110 is only one example of a suitable operating environment and is not intended to suggest any limitation as to the scope of use or functionality of the invention. Other well known computer systems, environments, and/or configurations that may be suitable for use with the invention include but are not limited to, personal computers, hand-held or laptop devices, multiprocessor systems, microprocessor-based systems, programmable consumer electronics, network PCs, minicomputers, mainframe computers, distributed computing environments that include the above systems or devices, and the like.

With reference to FIG. 11, an exemplary environment 1110 for implementing various aspects of the invention includes a computer 1112. The computer 1112 includes a processing unit 1114, a system memory 1116, and a system bus 1118. The system bus 1118 couples system components including, but not limited to, the system memory 1116 to the processing unit 1114. The processing unit 1114 can be any of various available processors. Dual microprocessors and other multiprocessor architectures also can be employed as the processing unit 1114.

The system bus 1118 can be any of several types of bus structure(s) including the memory bus or memory controller, a peripheral bus or external bus, and/or a local bus using any variety of available bus architectures including, but not limited to, 11-bit bus, Industrial Standard Architecture (ISA), Micro-Channel Architecture (MSA), Extended ISA (EISA), Intelligent Drive Electronics (IDE), VESA Local Bus (VLB), Peripheral Component Interconnect (PCI), Universal Serial Bus (USB), Advanced Graphics Port (AGP), Personal Computer Memory Card International Association bus (PCMCIA), and Small Computer Systems Interface (SCSI).

The system memory 1116 includes volatile memory 1120 and nonvolatile memory 1122. The basic input/output system (BIOS), containing the basic routines to transfer information between elements within the computer 1112, such as during start-up, is stored in nonvolatile memory 1122. By way of illustration, and not limitation, nonvolatile memory 1122 can include read only memory (ROM), programmable ROM (PROM), electrically programmable ROM (EPROM), electrically erasable ROM (EEPROM), or flash memory. Volatile memory 1120 includes random access memory (RAM), which acts as external cache memory. By way of illustration and not limitation, RAM is available in many forms such as synchronous RAM (SRAM), dynamic RAM (DRAM), synchronous DRAM (SDRAM), double data rate SDRAM (DDR SDRAM), enhanced SDRAM (ESDRAM), Synchlink DRAM (SLDRAM), and direct Rambus RAM (DRRAM).

Computer 1112 also includes removable/nonremovable, volatile/nonvolatile computer storage media. FIG. 11 illustrates, for example a disk storage 1124. Disk storage 1124 includes, but is not limited to, devices like a magnetic disk drive, floppy disk drive, tape drive, Jaz drive, Zip drive, LS-100 drive, flash memory card, or memory stick. In addition, disk storage 1124 can include storage media separately or in combination with other storage media including, but not limited to, an optical disk drive such as a compact disk ROM device (CD-ROM), CD recordable drive (CD-R Drive), CD rewritable drive (CD-RW Drive) or a digital versatile disk ROM drive (DVD-ROM). To facilitate connection of the disk storage devices 1124 to the system bus 1118, a removable or non-removable interface is typically used such as interface 1126.

It is to be appreciated that FIG. 11 describes software that acts as an intermediary between users and the basic computer resources described in suitable operating environment 1110. Such software includes an operating system 1128. Operating system 1128, which can be stored on disk storage 1124, acts to control and allocate resources of the computer system 1112. System applications 1130 take advantage of the management of resources by operating system 1128 through program modules 1132 and program data 1134 stored either in system memory 1116 or on disk storage 1124. It is to be appreciated that the present invention can be implemented with various operating systems or combinations of operating systems.

A user enters commands or information into the computer 1112 through input device(s) 1136. Input devices 1136 include, but are not limited to, a pointing device such as a mouse, trackball, stylus, touch pad, keyboard, microphone, joystick, game pad, satellite dish, scanner, TV tuner card, digital camera, digital video camera, web camera, and the like. These and other input devices connect to the processing unit 1114 through the system bus 1118 via interface port(s) 1138. Interface port(s) 1138 include, for example, a serial port, a parallel port, a game port, and a universal serial bus (USB). Output device(s) 1140 use some of the same type of ports as input device(s) 1136. Thus, for example, a USB port may be used to provide input to computer 1112, and to output information from computer 1112 to an output device 1140. Output adapter 1142 is provided to illustrate that there are some output devices 1140 like monitors, speakers, and printers among other output devices 1140 that require special adapters. The output adapters 1142 include, by way of illustration and not limitation, video and sound cards that provide a means of connection between the output device 1140 and the system bus 1118. It should be noted that other devices and/or systems of devices provide both input and output capabilities such as remote computer(s) 1144.

Computer 1112 can operate in a networked environment using logical connections to one or more remote computers, such as remote computer(s) 1144. The remote computer(s) 1144 can be a personal computer, a server, a router, a network PC, a workstation, a microprocessor based appliance, a peer device or other common network node and the like, and typically includes many or all of the elements described relative to computer 1112. For purposes of brevity, only a memory storage device 1146 is illustrated with remote computer(s) 1144. Remote computer(s) 1144 is logically connected to computer 1112 through a network interface 1148 and then physically connected via communication connection 1150. Network interface 1148 encompasses communication networks such as local-area networks (LAN) and wide-area networks (WAN). LAN technologies include Fiber Distributed Data Interface (FDDI), Copper Distributed Data Interface (CDDI), Ethernet/IEEE 1102.3, Token Ring/IEEE 1102.5 and the like. WAN technologies include, but are not limited to, point-to-point links, circuit switching networks like Integrated Services Digital Networks (ISDN) and variations thereon, packet switching networks, and Digital Subscriber Lines (DSL).

Communication connection(s) 1150 refers to the hardware/software employed to connect the network interface 1148 to the bus 1118. While communication connection 1150 is shown for illustrative clarity inside computer 1112, it can also be external to computer 1112. The hardware/software necessary for connection to the network interface 1148 includes, for exemplary purposes only, internal and external technologies such as, modems including regular telephone grade modems, cable modems and DSL modems, ISDN adapters, and Ethernet cards.

What has been described above includes examples of the present invention. It is, of course, not possible to describe every conceivable combination of components or methodologies for purposes of describing the present invention, but one of ordinary skill in the art may recognize that many further combinations and permutations of the present invention are possible. Accordingly, the present invention is intended to embrace all such alterations, modifications, and variations that fall within the spirit and scope of the appended claims. Furthermore, to the extent that the term "includes" is used in either the detailed description or the claims, such term is intended to be inclusive in a manner similar to the term "comprising" as "comprising" is interpreted when employed as a transitional word in a claim.

What is claimed is:

1. An autofill system comprising:
   a trained machine learning component that uses one or more sets of inputs to facilitate autofilling a form field in a web-based form; and
   an autofill component that selectively enters data into the first form field and a second form field based at least in part upon information generated by the machine learning component, the information is generated as a function of a characteristic of at least a third field and includes a joint probability computed from a first probability that the data entered into the first form field is appropriate for the first form field and a second probability that the data entered into the second form field is appropriate for the second form field and wherein the data is consistent with one or more constraints, wherein the components are implemented with hardware.

2. The system of claim 1, the one or more sets of inputs are stored in and retrieved from one or more databases.

3. The system of claim 2, the machine learning component learns to map from a plurality of database fields to corresponding form fields.

4. The system of claim 2, the one or more databases comprising at least one of an autofill database, contact list database, account registration database, and product registration database.

5. The system of claim 2, the machine learning component generates assignments of database entries based at least in part upon the one or more constraints.

6. The system of claim 5, the one or more constraints comprising reuse constraints that limit a number of times any one database entry is used per web-based form.

7. The system of claim 5, the one or more constraints comprising composition constraints that control which database entries or output types are allowed to be present concurrently on any web-based form.

8. The system of claim 5, the one or more constraints comprising constraints on fields occurring together or in a particular order.

9. The system of claim 2, the input in the database corresponds to one or more database or input fields, the database or input fields having one or more features derived therefrom.

10. The system of claim 9, at least one feature is for a particular database field being at least one of above, below, to the left of, to the right of, immediately below, immediately above, immediately to the left of, or immediately to the right of some other database field.

11. The system of claim 10, further comprising a component that determines a joint probability of a particular assignment of input fields to form fields that includes the at least one feature.

12. The system of claim 2, further comprising a component that personalizes mapping from database fields to form values by learning that for a particular user, some input field entries correspond to observed database entries and that updates the autofill component with such information.

13. The system of claim 12, the component updates the autofill component in a site-specific manner that involves learning that some input field entries on a particular web page correspond to particular database entries.

14. The system of claim 2, the machine learning component observes that a user is entering data into a field consistent with data found in the one or more databases which triggers the autofill component to provide new autofill suggestions based in part on best ranked consistent entries.

15. The system of claim 2, the one or more databases are maintained on a machine separate from the user's computer.

16. The system of claim 1, further comprising a data collection component that collects training data from one or more sources.

17. The system of claim 16, the data collection component aggregates the input and sends it to a central repository for further processing.

18. The system of claim 16, the data collection component comprises at least one instrumented toolbar.

19. The system of claim 1, the input comprising MAXLENGTH or SIZE entries.

20. The system of claim 1, the input comprising substrings of a field name.

21. The system of claim 1, the input comprising information from one or more adjacent form fields.

22. The system of claim 1, the input comprising at least one of nearby text or substrings of nearby text.

23. The system of claim 1, the machine learning component converts one or more inputs to one or more feature values.

24. The system of claim 23, the features values are one of Boolean values or numeric values.

25. The system of claim 24, the Boolean values are determined automatically by performing at least one of the following:
   finding useful ranges; and
   looking for common and useful character sequences.

26. The system of claim 24, the Boolean values are determined manually by inspecting input values and determining one or more most useful Boolean values.

27. The system of claim 1, the autofill component provides autofill suggestions in a drop down box from the first field when a user begins to enter data into the first field.

28. The system of claim 1, the autofill component fills a field with suggested data as soon as a user enters the field.

29. The system of claim 1, further comprising a component that detects whether the web-based form comprises multiple varieties of fields and separates them into at least two subsets of fields.

30. The system of claim 29, the component employs Heuristics to detect the multiple sets and to separate them into at least two subsets.

31. The system of claim 1, the machine learning component comprises a monitoring component that observes user entries of form fields to facilitate learning what value is most appropriate for the first form field.

32. The system of claim 31, the machine learning component learns which of the entries a user has previously made that he is most likely to enter into a given input field.

33. The system of claim 32, the machine learning component does not learn user entries for fields that appear to comprise sensitive information.

34. The system of claim 31, the machine learning component makes use of one or more database entries and observed entries to learn at least one of the following:
- a probability of a field being filled with an entry from the database times a probability that the database field is a correct entry; and
- a probability of a field not being filled with an entry from the database times a probability computed by observing user entries.

35. The system of claim 31, the machine learning component generating one or more features based in part on the values possible for the fields.

36. The system of claim 35, the one or more features are order-based for each value preceding a next value.

37. The system of claim 31, the machine learning system is trained using an offline algorithm that includes collecting a plurality of observed instances of field entries and storing them.

38. The system of claim 31, the machine learning system is trained using an online algorithm using any one of Naïves Bayes approach, gradient descent, winnow, and perceptron algorithm.

39. The system of claim 1, the first form field comprises a file input field that displays a file based in part on recently accessed files.

40. The system of claim 39, the file entered by the autofill component is determined based in part on some combination of recently used entries in the file input field and recently accessed files.

41. The system of claim 40, the combination is based at least in part on a time of last access and a time of last entry.

42. The system of claim 1, the first and second form fields comprise radio buttons and check boxes such that the autofill component can learn whether to check or uncheck a box or select a radio button.

43. A computer readable medium having stored thereon the system of claim 1.

44. An autofill system, comprising:
- a machine learning component that is trained to complete a first form field and a second form field of a web-based form based at least in part on observations of user entries into at least a third form field of the web-based form;
- a data collection component that collects training data from at least one source, which training data is used to train the machine learning component; and
- an autofill component that automatically enters anticipated data into the first form field and the second form field based at least in part upon information learned from the observations of the third form field made by the machine learning component, the information including a joint probability computed by multiplying a first probability that the data entered the first form field is appropriate for the first form field by a second probability that the data entered into the second form field is appropriate for the second form field and wherein the data is consistent with one or more constraints, wherein the components are implemented with hardware.

45. An autofill system, comprising:
- a trained machine learning component that generates assignments of database entries to a first form field and a second form field of a web-based form based at least in part on a third form field on the web-based form; and
- an autofill component that automatically enters the database entries into the first form field and the second form filed based at least in part upon learned user preferences observed by the machine learning component and a joint probability computed from a first probability and a second probability that the respective database entries are appropriate for the first form field and the second form field and wherein the database entries are consistent with one or more constraints and wherein the components are implemented with hardware.

* * * * *